(12) United States Patent
Butsch

(10) Patent No.: US 10,723,284 B2
(45) Date of Patent: Jul. 28, 2020

(54) TRIM PART

(71) Applicant: Richard Fritz Holding GmbH, Besigheim (DE)

(72) Inventor: Erwin Butsch, Winnenden (DE)

(73) Assignee: Richard Fritz Holding GmbH, Besigheim (DE)

( * ) Notice: Subject to any disclaimer, the term of this patent is extended or adjusted under 35 U.S.C. 154(b) by 139 days.

(21) Appl. No.: 15/855,844

(22) Filed: Dec. 27, 2017

(65) Prior Publication Data

US 2018/0178734 A1 Jun. 28, 2018

(30) Foreign Application Priority Data

Dec. 28, 2016 (DE) .................. 10 2016 125 814

(51) Int. Cl.
*B60R 13/02* (2006.01)
*B32B 17/10* (2006.01)
*B29C 45/16* (2006.01)

(52) U.S. Cl.
CPC ...... *B60R 13/025* (2013.01); *B32B 17/10018* (2013.01); *B60R 13/0206* (2013.01); *B29C 45/1676* (2013.01); *B32B 2274/00* (2013.01)

(58) Field of Classification Search
CPC ............. B60R 13/025; B60R 13/0206; B32B 17/10018
USPC ............................ 296/93, 84.1, 1.08, 193.06
See application file for complete search history.

(56) References Cited

U.S. PATENT DOCUMENTS

| | | | | |
|---|---|---|---|---|
| 4,988,142 A | * | 1/1991 | Chandler | ............... B60J 5/0402 296/146.2 |
| 6,722,731 B2 | * | 4/2004 | Cornils | ...................... B60J 1/02 296/146.15 |
| 2011/0291437 A1 | * | 12/2011 | Watou | ..................... B60J 10/35 296/93 |

\* cited by examiner

*Primary Examiner* — Joseph D. Pape
(74) *Attorney, Agent, or Firm* — Renner, Otto, Boisselle & Sklar, LLP

(57) ABSTRACT

The invention relates to a trim part for a motor vehicle, having a support part (18) made from a thermoplastic material and having a cover part (12) which has a visible surface (14) and is connected at least sectionally to a fastening element (25) opposite the visible surface (14), wherein the cover part (12) is formed from a glass.

11 Claims, 2 Drawing Sheets

TRIM PART

CROSS-REFERENCE TO RELATED APPLICATIONS

This application claims the benefit of and priority to German Patent Application Serial No. DE 10 2016 125 814.8 filed on Dec. 28, 2016, which application is incorporated herein by reference in its entirety.

BACKGROUND OF THE INVENTION

The invention relates to a trim part for a motor vehicle.

A trim part is known from DE 202 01 528 01. This trim part is formed in the shape of a pillar panel, for example for a B-pillar on a motor vehicle. It is provided that this trim part consists of an individual plastic profile which is produced in a plastic injection moulding process, which has both a support part for fastening to the vehicle and a high-gloss visible surface.

Furthermore, a trim part is known from EP 1 695 808 B1, in which the support part is formed from a thermoplastic material having high mechanical resistance and good impact resistance, to take over the fastening function. A cover part made of plastic is injected to this support part, wherein this cover part is formed from a different plastic from the support part. A multi-component injection moulding process is provided for this.

Such trim parts have the disadvantage that the visible surface of the cover part, said visible surface being formed of plastic, does not sufficiently fulfil the requirements for scratch resistance and/or weather resistance.

BRIEF SUMMARY OF SOME EXAMPLE EMBODIMENTS

The object of the invention is to propose a trim part which has a visible surface with an increased scratch resistance and weather resistance.

This object is solved by a trim part wherein the support part, which consists of a thermoplastic material, is connected to a cover part formed of glass to form a trim part. This design of the visible surface with a glass enables a higher scratch resistance. Additionally, the glass has the advantage of weather resistance. Furthermore, a continuous surface structure can be formed relative to the adjoining glass surfaces of the door or doors and/or permanently fitted pane units, in particular when this trim part is used as a pillar panel of a B pillar.

A single-pane safety glass is preferably provided. This can fulfil the safety functions sufficiently. Alternatively, a partially tempered glass can be used. The cover part can also be formed from a laminated safety glass.

The cover part made of glass has a thickness of from 1.5 mm to 5 mm. For a single-pane safety glass, a wall thickness of 3 to 5 mm is preferably used. For a partially tempered glass, a cover part thickness of 1.5 to 2.5 mm can be provided. For a laminated safety glass, a total strength of 4 to 6 mm can be used.

The cover part is preferably fastened to a fixing portion of the support part using back injection moulding. Preferably, the cover part and the support part are placed in a mould. Back-injection moulding subsequently takes place, whereby a fastening surface which is opposite to the visible surface of the cover part is connected to the support part by the plastic which is inserted into the mould. Preferably a TPE (thermoplastic elastomer) or a similar plastic which can be injected, such as for example thermoplastic polyolefin or PU, is used to create a lasting connection between the support part and the cover part. Preferably, only one part of the fastening surface is injected or back-injected as the rear side of the visible surface.

According to an alternative embodiment of the trim part, the cover part can be fastened to a fixing portion of the support part by an adhesive bond. For such an adhesive bond, this can be, for example, an adhesive tape or a double-sided adhesive strip. Alternatively, plastic bonding can take place, by, for example, an adhesive bead being applied to the fastening surface of the cover part and/or the fixing portion on the support part, so that the two parts preferably connect to each other under pressure. A PU or MS polymer adhesive bond is preferably provided.

According to a further alternative embodiment of the trim part, it is provided that a fastening portion made of plastic is at least sectionally injected onto a fastening surface of the cover part, and this fastening portion of the support part is fused with a fixing portion of the support part. A permanent connection between the cover part and the support part can thus also be created. Ultrasound welding, vibration welding or laser welding is preferably used to produce a weld joint. The fastening portion only can be provided on the fastening surface, i.e. the rear side of the cover part. This fastening portion can also comprise an end side of the cover part, which borders both the visible side of the cover part and the fastening surface of the cover part.

Furthermore, an end side of the cover part, which borders the visible surface and the fastening surface, is preferably surrounded at least sectionally by an overmoulding. Edge protection of the cover part made from glass can thus be provided. This overmoulding is preferably produced from a thermoplastic material.

This overmoulding of the end side on the cover part preferably ends flush with the visible surface of the cover part. The end edge or end side of the cover part is thus fully surrounded. Alternatively, the overmoulding can also be set back slightly with respect to the visible surface. This overmoulding preferably extends in the edge region of the fastening surfaces and adjacent to the end side.

Alternatively, a sealing element can be used between the support part and the cover part to protect the end surface of the cover part which is formed from glass. This sealing element serves simultaneously to seal against a chassis part. Advantageously, an EPDM sealing element is provided. In particular, this has a lug or a point, which lies both intentionally and protectively on the end side of the cover part.

Furthermore, an overmoulding of the end side of the cover part and a fastening of the fastening surface of the cover part to the support part are formed by a combined back injection. A more compact structure can thus be achieved.

A further alternative embodiment of the trim panel provides that the support part is formed as a two- or multi-component injection moulded part, which is preferably injected directly onto the cover part made of glass. For example, a soft component can be injected directly onto a fastening surface and/or an end side of the cover part, and a hard component subsequently injected to form the support part. Polypropylene, polyurethane, polyamide or polyvinylchloride, for example, can be used as a hard component. These plastics have a high flexural modulus. TPE (thermoplastic elastomer), PU (polyurethane), soft PVC or the like, for example, are used as a soft component. The soft component also has a sealing function, in particular when at least partially surrounding the end side of the cover part. Alternatively, the hard component can be first injected onto the cover part and then after this the soft component.

These and other objects and features of the present invention will become more fully apparent from the following description and appended claims, or may be learned by the practice of the invention as set forth hereinafter.

BRIEF DESCRIPTION OF THE DRAWINGS

The invention as well as further advantageous embodiments and developments of the same are described and explained in more detail below, using the examples illustrated in the drawings. The features to be taken from the description and the drawings can be used according to the invention individually or in multiple in any combination. In the drawings.

DETAILED DESCRIPTION OF SOME EXAMPLE EMBODIMENTS

Figure 1:
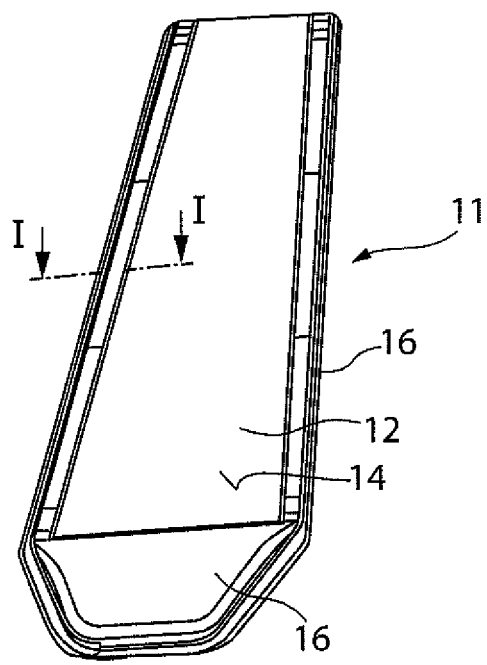
FIG. 1 shows a schematic view of a trim part.
Figure 2:
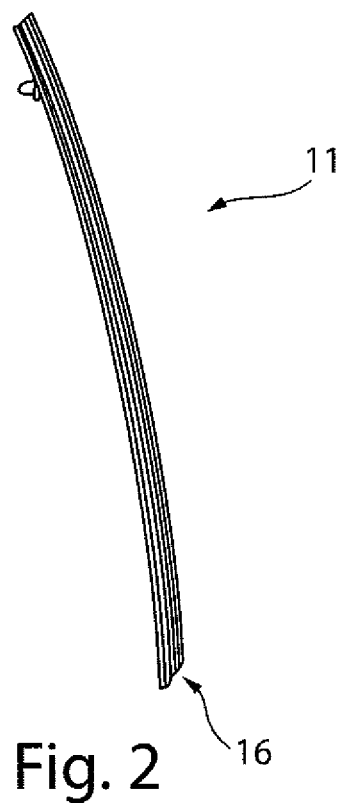
FIG. 2 shows a schematic side view of the trim part according to FIG. 1.
Figure 3:
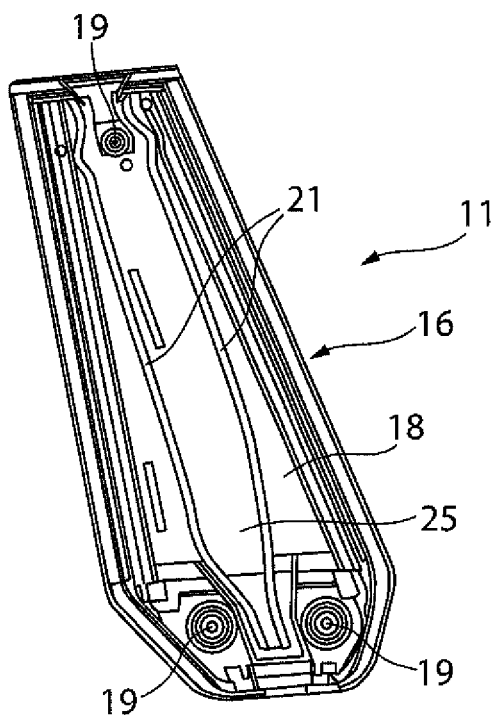
FIG. 3 shows a schematic rear view of the trim part according to FIG. 1.

In FIG. 1, a schematic view of a visible side of a trim part 11 is illustrated. FIG. 2 shows a side view of the trim part 11. In FIG. 3, a rear side of the trim part 11 according to FIG. 1 is illustrated.

This trim part 11 is, for example, formed as a pillar panel or a trim panel for a motor vehicle. The trim part 11 consists of a cover part 12 having a visible surface 14. This cover part 12 is at least surrounded by a sealing element 16. A support part 18 (FIG. 3) is provided on a rear side relative to the visible surface 14 of the cover part 12. Fastening elements 19, such as, for example, clips or the like, are provided on this support part 18 to fix the trim part 11 to a vehicle chassis.

An upper fastening element 19 can, for example, be adhered directly to a rear side of the cover part 12—so to a fastening surface 25—or fastened with an overmoulding. The further fastening elements 19 in the lower region of the trim part 11 are arranged on a portion of the support part 18. Alternatively, the upper fastening element/s 19 can likewise be arranged on the support part 18.

The support surface 18 is formed from a plastic with high mechanical resistance and good impact resistance and has, for example, a flexural modulus greater than 1000 N mm2. For example, the support material is made of PC, ABS.

The cover part 12 is formed from glass. This glass can also be coated. This glass can also be tinted. Such a glass has a high weather resistance and scratch resistance. A single-pane safety glass, a tempered glass or a laminated safety glass can be provided as a glass. The cover part 12 can also be curved.

Figure 4:
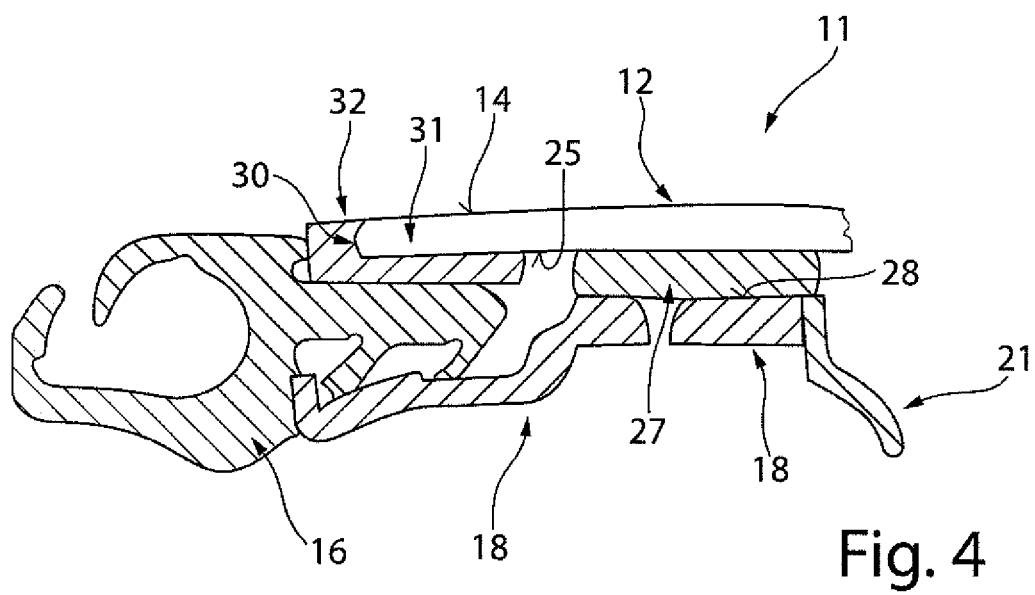
FIG. 4 shows a schematic sectional view along the line I-I in FIG. 1.

In FIG. 4, a sectional view along the line I-I in FIG. 1 is illustrated. The support part 18 has, for example, a sealing lip 21 which is injected on or adhered, made in particular of EPDM or TPE, which is orientated towards the chassis side or fastening side of the trim part 11. The sealing element 16 is provided on an outer side of the support part 18. This sealing element 16 surrounds at least both longitudinal sides of the cover part. The sealing profile preferably surrounds the cover part 12 in a fully circulating manner. The sealing element 16 can be formed, for example, from EPDM, in particular an EPDM profile. Opposite the visible surface 14 of the cover part 12, the cover part 12 has a fastening surface 25. This fastening surface 25 forms a rear side of the cover part 12 which is formed of glass. This fastening surface 25 can also be coated for decoration purposes. Alternatively, the cover part 12 can also be coloured for decoration purposes.

The cover part 12 is connected to a fixing portion 28 of the support part 18 by an adhesive bond 27. This adhesive bond 27 can be formed as a plastic adhesive bond, in particular a PU adhesive bond, by application of an adhesive bead.

In this embodiment according to FIG. 4, it is furthermore advantageously provided that an end side 30 of the cover part 12 as well as an edge region 31 of the fastening surface 25 has an overmoulding 32. This overmoulding 32 advantageously fully surrounds the end side 30, so that this overmoulding 32 ends flush with the visible surface 14. The overmoulding 32 extends advantageously at least along both longitudinal end sides of the trim part 11. Additionally, one or both narrow sides of the cover part 12 can likewise be surrounded by the overmoulding 32. The overmoulding 32 preferably extends fully along the end sides 30 of the cover part 12 to form an edge protector.

The sealing element 16 is inserted and preferably held in a latching manner between the cover part 12 and the support part 18.

Alternatively, in this embodiment according to FIG. 4, the end side 30 of the cover part 12 can be provided free from an overmoulding 32, so that the sealing element 16 lies directly on the end side 30 of the cover part 12, as subsequently further described in FIG. 6.

Figure 5:
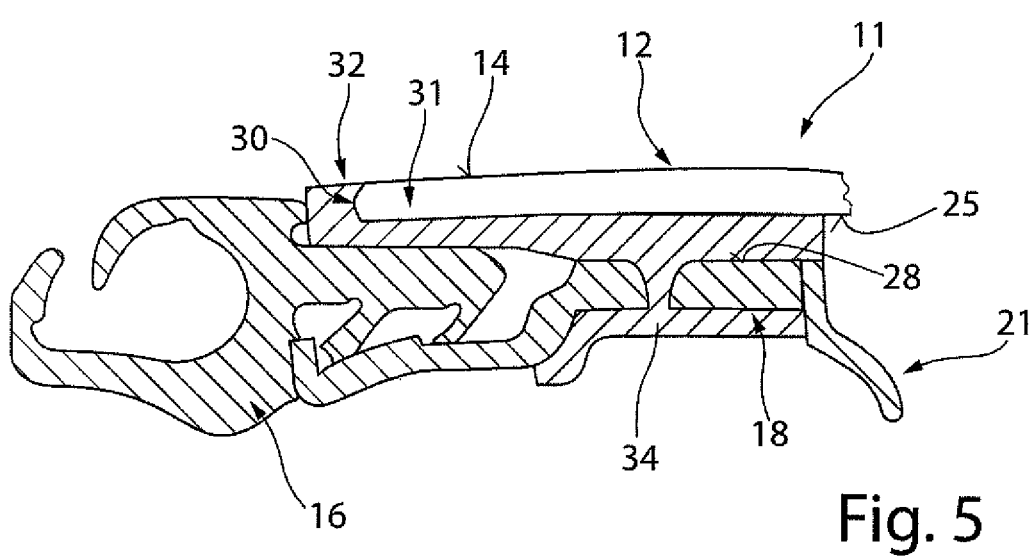
FIG. 5 shows a schematic sectional view of the trim part according to an alternative embodiment to FIG. 4.

In FIG. 5, an alternative embodiment of the trim part 11 to FIG. 4 is illustrated. In this embodiment, the cover part 12 is connected to the support part 18 by a back injection 34. For example, a TPE or PU back injection can be carried out. This back injection 34 can extend only along the fastening surface 25, so that an edge region 31 and/or the end side 30 is free of the back injection 34. Alternatively, the back injection 34 can also include the end side 30, so that protection for the end side 30 of the cover part 12 is again provided by the back injection 34. The sealing element 16 is in turn fastened to the cover part 12 by clipping or clamping between the support part 18 and the back injection 34.

In the embodiment illustrated in FIG. 5, the support part 18 and the cover part 12 are formed as an insertion part. These are inserted into a tool, in order to subsequently back inject the cover part 12 through one or several injection points and connect to the support part 18. Alternatively, the cover part 12 can be inserted into a multi-component injection moulding tool, in order to subsequently form the back injection 34 and thereafter the support part 18 in a two- or multi-component injection moulding process.

Figure 6:
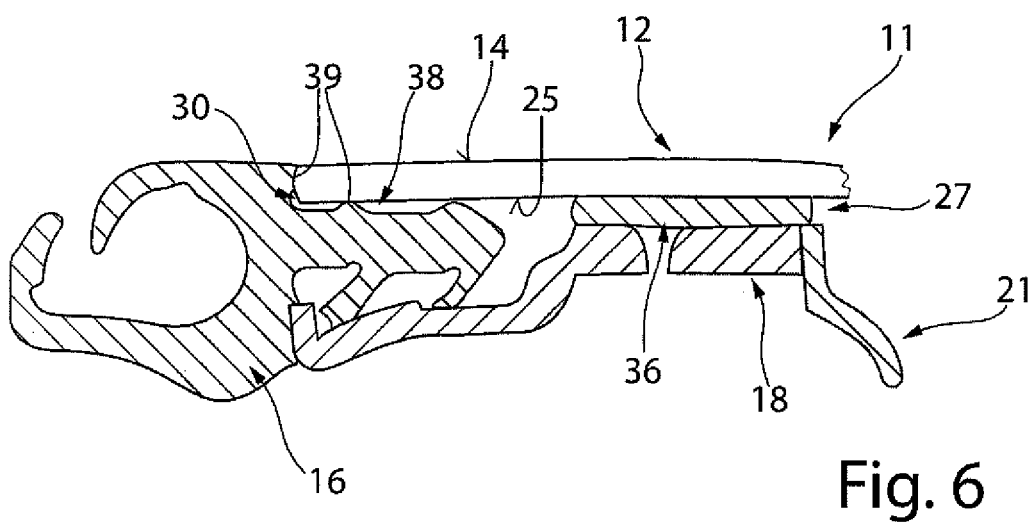
FIG. 6 shows a schematic sectional view of a further alternative embodiment of the trim part to FIG. 4.

In FIG. 6, a further alternative embodiment of the trim part 11 to FIG. 4 is illustrated. In this embodiment, unlike FIG. 4, instead of the use of adhesion 27, in particular by means of an adhesive bead, a double-sided adhesive tape 36 for adhesion of the cover part 12 to the support part 18 is provided. The sealing element 16 is held between the support part 18 and the cover part 12 by clipping or clamping. The sealing element 16 thus preferably has a sealing portion 38, which is formed in an L-shape, so that this sealing portion 38 lies on the end side 30 and the edge region 31 of the fastening surface 25 on the cover part 12. The sealing portion 38 preferably also comprises sealing lugs or projections 39, so that a sealing arrangement of the sealing element 16 to the cover part 12 is provided.

A further alternative embodiment of the trim part 11 can be formed by welding a fastening portion, which adjoins the cover part 12, to a fixing portion 28 of the support part 18. Such a fastening portion can, for example, correspond in its planar extension, according to the adhesion illustrated in FIG. 4. Alternatively, such a fastening portion can also by formed by a back injection 34 according to the embodiment in FIG. 5, wherein this back injection does not engage behind the support part 18, but instead is welded by means of the fixing portion 28. Furthermore, the alternative embodiment of the welding of the fastening element on the cover part 12 can be carried out with the fixing portion 28 of the support part 18 analogously to the embodiment in FIG. 6, according to which the fastening portion is injected to the cover part 12 corresponding to the extent of the adhesive tape 36.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Trim part for a motor vehicle, the trim part for a motor vehicle comprising:
   a support part made from a thermoplastic material;
   a cover part, which has a visible surface and is connected at least sectionally to the support part via a fastening surface opposite the visible surface,
   wherein:
      the cover part is formed from a glass;
      a fastening portion made of plastic is injected at least sectionally onto the fastening surface of the cover part; and
      the fastening portion is welded to a fixing portion of the support part.

2. Trim part according to claim 1, wherein the cover part is formed from a single-pane safety glass, from a partially tempered glass or a laminated safety glass.

3. Trim part according to claim 1, wherein the cover part has a thickness of from 1.5 to 5 mm.

4. Trim part according to claim 1, wherein at least one end side of the cover part which extends between the visible surface and the fastening surface and borders these is at least sectionally surrounded by an overmoulding.

5. Trim part according to claim 4, wherein the overmoulding is formed by a frame made of plastic and the frame ends flush with the visible surface.

6. Trim part according to claim 1 wherein at least one end side of the cover part which is formed between the visible surface and the fastening surface and borders these is protected by an adjacent sealing element, which is attachable between the cover part and the support part.

7. Trim part according to claim 1, wherein an overmoulding of an end side of the cover part and a fastening of the fastening surface of the cover part to the fixing portion of the support part is formed by a back injection.

8. Trim part according to claim 1, wherein the support part is formed from a two- or multi-component injection moulded part.

9. Trim part according to claim 1, wherein the support part is injected directly onto the cover part.

10. Trim part for a motor vehicle, the trim part for a motor vehicle comprising:
    a support part made from a thermoplastic material;
    a cover part, which has a visible surface and is connected at least sectionally to the support part via a fastening surface opposite the visible surface,
    wherein:
       the cover part is formed from a glass;
       at least one end side of the cover part which extends between the visible surface and the fastening surface and borders these is at least sectionally surrounded by an overmoulding; and
       the overmoulding is formed by a frame made of plastic and the frame ends flush with the visible surface.

11. Trim part for a motor vehicle, the trim part for a motor vehicle comprising:
    a support part made from a thermoplastic material;
    a cover part, which has a visible surface and is connected at least sectionally to the support part via a fastening surface opposite the visible surface,
    wherein:
       the cover part is formed from a glass;
       at least one end side of the cover part which is formed between the visible surface and the fastening surface and borders these is protected by an adjacent sealing element, which is attachable between the cover part and the support part.

* * * * *